United States Patent
Knutson et al.

(10) Patent No.: US 11,872,780 B2
(45) Date of Patent: Jan. 16, 2024

(54) METHODS AND TOOL FOR CUTTING AN UNCURED COMPOSITE MATERIAL

(71) Applicant: The Boeing Company, Chicago, IL (US)

(72) Inventors: Samuel James Knutson, Charleston, SC (US); Raviendra Sidath Suriyaarachchi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 79 days.

(21) Appl. No.: 17/805,060

(22) Filed: Jun. 2, 2022

(65) Prior Publication Data

US 2023/0391026 A1 Dec. 7, 2023

(51) Int. Cl.
*B29C 70/54* (2006.01)
*B25J 11/00* (2006.01)

(52) U.S. Cl.
CPC ......... *B29C 70/545* (2013.01); *B25J 11/0055* (2013.01)

(58) Field of Classification Search
CPC .............................. B29C 70/54; B29C 70/545
See application file for complete search history.

(56) References Cited

U.S. PATENT DOCUMENTS

| | | |
|---|---|---|
| 4,809,191 A | 2/1989 | Domeier et al. |
| 4,898,636 A | 2/1990 | Rigling et al. |
| 8,168,023 B2 | 5/2012 | Chapman et al. |
| 8,752,791 B2 | 6/2014 | Griess et al. |
| 10,001,365 B2 | 6/2018 | Smith et al. |
| 10,831,173 B2 | 11/2020 | Knutson et al. |
| 11,220,353 B2 | 1/2022 | Knutson et al. |
| 2010/0191360 A1 | 7/2010 | Napadensky et al. |
| 2013/0015292 A1 | 1/2013 | Zielinsky et al. |
| 2014/0208592 A1 | 7/2014 | Wright et al. |
| 2014/0214184 A1 | 7/2014 | Freeman |
| 2015/0003927 A1 | 1/2015 | Spishak et al. |
| 2015/0090392 A1 | 4/2015 | Bertrand et al. |
| 2015/0183503 A1 | 7/2015 | Miguez et al. |

(Continued)

FOREIGN PATENT DOCUMENTS

| | | |
|---|---|---|
| CN | 1662347 A | 8/2005 |
| CN | 204603387 U | 9/2015 |

(Continued)

OTHER PUBLICATIONS

China National Intellectual Property Administration Office Action and English Translation, dated Dec. 16, 2022, regarding Application No. CN/201810834040.4, 23 pages.

(Continued)

*Primary Examiner* — Jeffry H Aftergut
(74) *Attorney, Agent, or Firm* — Yee & Associates, P.C.

(57) ABSTRACT

A method of cutting an uncured composite material is presented. The uncured composite material is positioned onto a surface of a tool and over a groove in the surface, the groove having a groove filler and magnetic material within the groove. A cutter having a guide is positioned relative to the uncured composite material, the guide configured to detect the magnetic material. The uncured composite material is cut above the groove using the cutter as the cutter moves along a path defined by the groove, the cutter guided by the guide detecting the magnetic material in the groove.

22 Claims, 10 Drawing Sheets

(56) References Cited

U.S. PATENT DOCUMENTS

| | | |
|---|---|---|
| 2015/0286211 A1 | 10/2015 | Sticht et al. |
| 2016/0271696 A1 | 9/2016 | Kamakura |
| 2017/0001258 A1 | 1/2017 | Hildebrand et al. |
| 2017/0017224 A1 | 1/2017 | Skaggs et al. |
| 2017/0266878 A1 | 9/2017 | Furukaw |
| 2018/0284719 A1 | 10/2018 | Lever |
| 2019/0049919 A1* | 2/2019 | Knutson ............... G05B 19/402 |
| 2019/0366574 A1* | 12/2019 | Bosworth ........ G05B 19/41875 |
| 2020/0094497 A1 | 3/2020 | Saini et al. |
| 2020/0331634 A1 | 10/2020 | Knutson et al. |

FOREIGN PATENT DOCUMENTS

| | | | |
|---|---|---|---|
| CN | 105035348 A | | 11/2015 |
| CN | 106152921 A | | 11/2016 |
| CN | 106354089 A | | 1/2017 |
| EP | 0396466 A2 | | 11/1990 |
| EP | 0957336 A2 | | 11/1999 |
| EP | 1132164 A2 | | 9/2001 |
| EP | 1495827 A2 | | 1/2005 |
| EP | 1738881 A2 | | 1/2007 |
| GB | 2094210 A | * | 9/1982 |
| JP | 2005524542 A | | 8/2005 |
| JP | 2014524854 A | | 9/2014 |
| JP | 2017100273 A | | 6/2017 |
| WO | 03095154 A1 | | 11/2003 |

OTHER PUBLICATIONS

Office Action dated Jan. 7, 2021 regarding U.S. Appl. No. 16/388,791; 11 pages.

Final Office Action dated May 13, 2021 regarding U.S. Appl. No. 16/388,791; 12 pages.

Notice of Allowance dated Sep. 13, 2021 regarding U.S. Appl. No. 16/388,791; 8 pages.

Office Action dated Aug. 19, 2019 regarding U.S. Appl. No. 15/675,252; 25 pages.

Final Office Action dated Jan. 13, 2020 regarding U.S. Appl. No. 15/675,252; 21 pages.

Office Action dated May 1, 2020 regarding U.S. Appl. No. 15/675,252; 24 pages.

Notice of Allowance dated Sep. 17, 2020 regarding U.S. Appl. No. 15/675,252; 7 pages.

Corrected Notice of Allowance dated Nov. 10, 2021 regarding U.S. Appl. No. 16/388,791; 6 pages.

Japanese Office Action dated May 31, 2022 regarding JP Application No. 2018-142585; 6 pages.

* cited by examiner

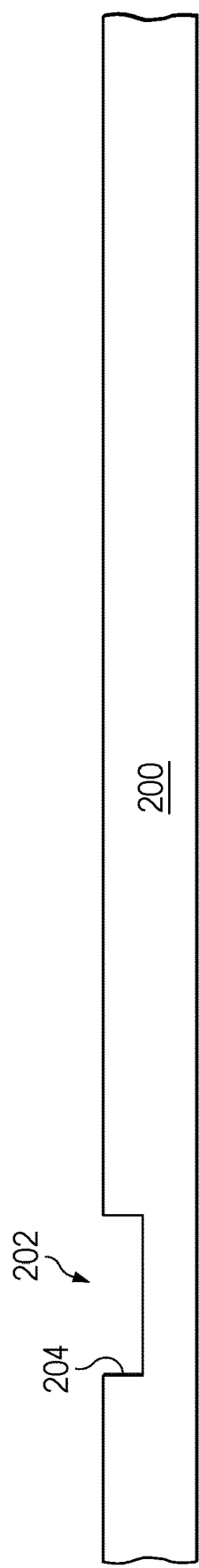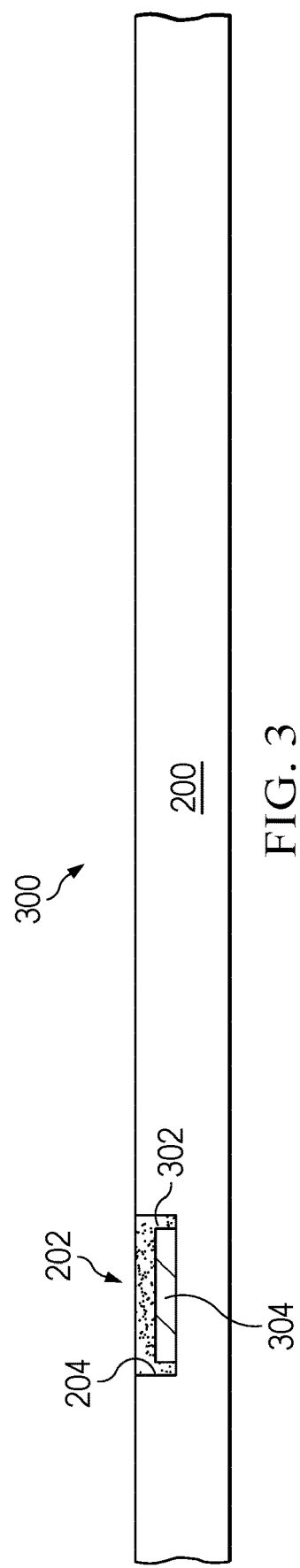

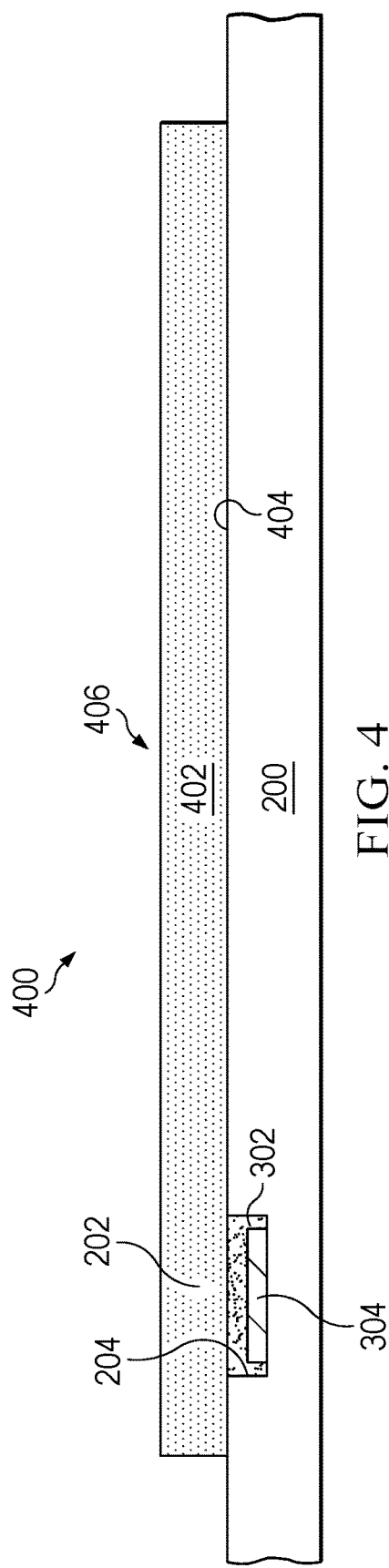
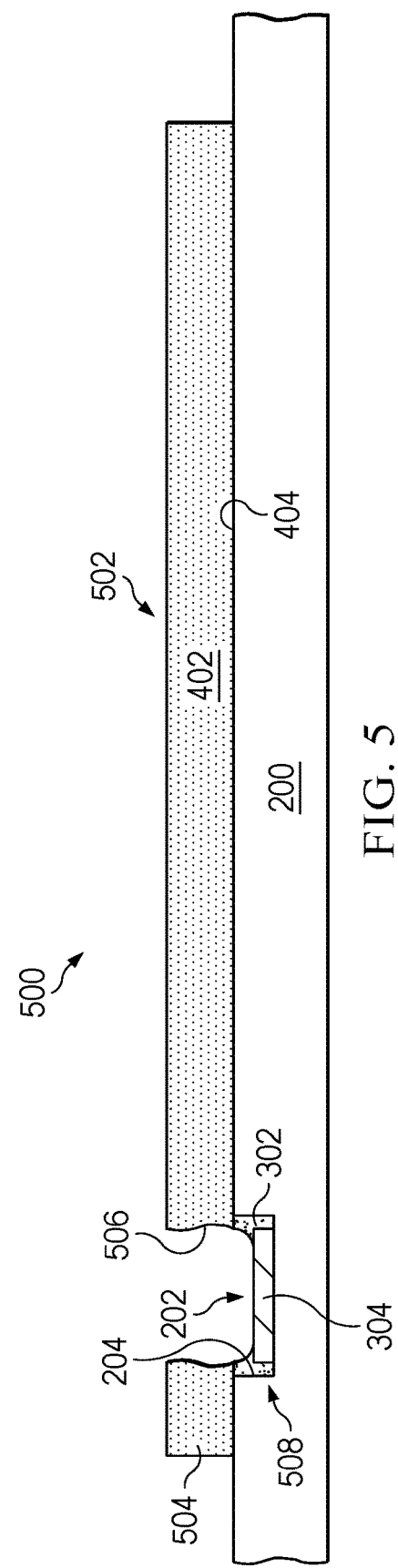

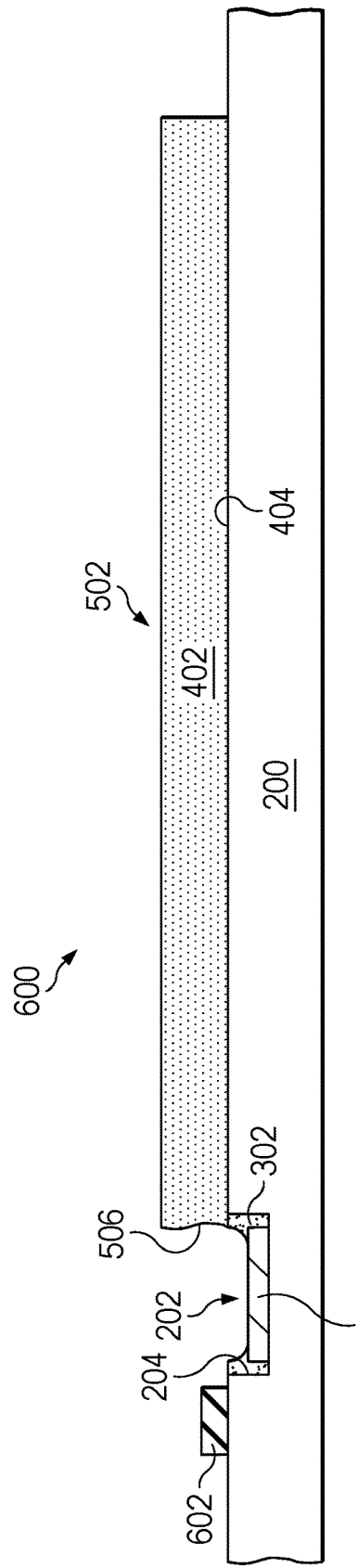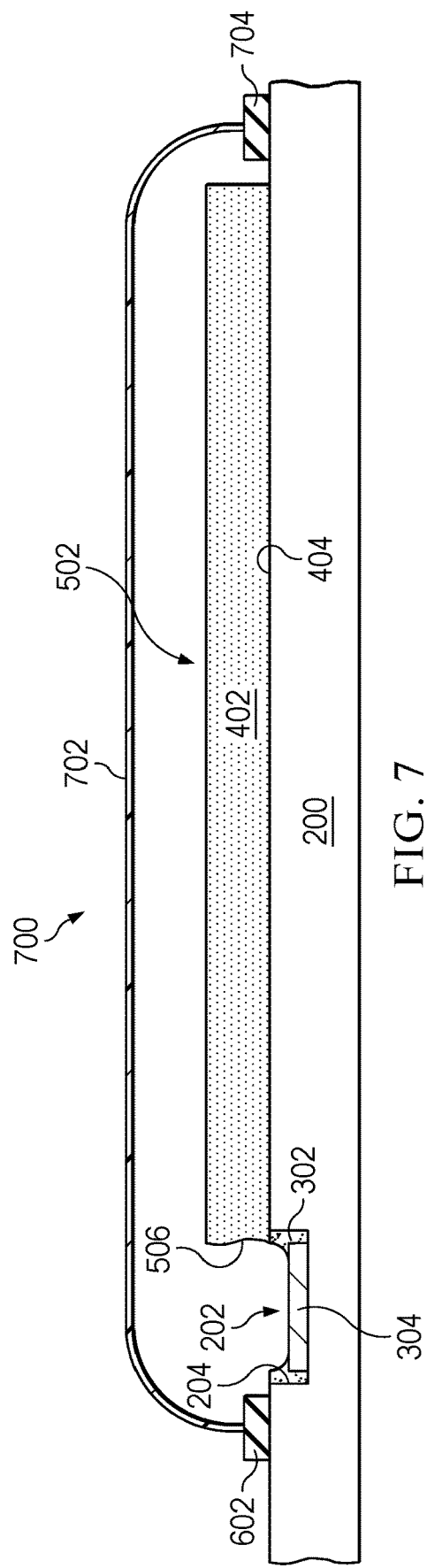

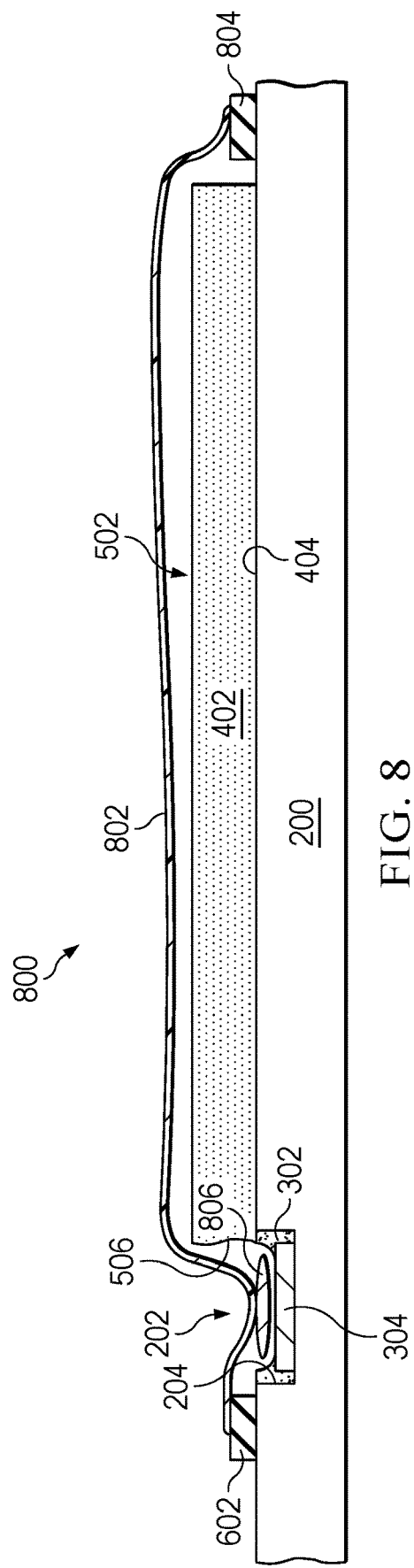

METHODS AND TOOL FOR CUTTING AN UNCURED COMPOSITE MATERIAL

BACKGROUND INFORMATION

1. Field

The present disclosure relates generally to composite material processing and more specifically to methods and a tool for cutting an uncured composite material.

2. Background

In conventional composite manufacturing, composite material is laid up layer-by-layer on a lay-up tool. The composite material may be laid up as fabrics, tape, or tows. Composite materials can be laid up to a desired shape using numerically controlled lay-up tools at considerable time and expense. When composite material is laid up, the composite material is in an uncured state, which may also be referred to as a "green" state. Afterwards, the composite material is cured. The cured composite material is then trimmed.

When composite material is laid-up directly on a curing tool, the cycle time of the curing tool includes both curing time and lay-up time. Current composite processing can be at least one of undesirably time-consuming or undesirably expensive.

Therefore, it would be desirable to have a method and apparatus that takes into account at least some of the issues discussed above, as well as other possible issues. For example, it would be desirable to present a method of composite material processing that reduces at least one of processing time or expense.

SUMMARY

An embodiment of the present disclosure provides a method of cutting an uncured composite material. The uncured composite material is positioned onto a surface of a tool and over a groove in the surface, the groove having a groove filler and magnetic material within the groove. A cutter having a guide is positioned relative to the uncured composite material, the guide configured to detect the magnetic material. The uncured composite material is cut above the groove using the cutter as the cutter moves along a path defined by the groove guided by the guide detecting the magnetic material in the groove.

Another embodiment of the present disclosure provides a method of generating a numerical control cutting program. A cutter is positioned relative to an uncured composite material on a tool, the cutter having a guide configured to detect a magnetic material in a groove of the tool. The uncured composite material is cut above the groove using the cutter as the cutter moves along a path defined by the groove guided by the guide detecting the magnetic material in the groove. A self-teaching program is run as the cutter cuts the uncured composite material above the groove to generate a cutting path.

Yet another embodiment of the present disclosure provides a tool comprising a surface, a number of grooves in the surface, a groove filler within the number of grooves, and magnetic material within the number of grooves. The surface is configured to support uncured composite material during cutting of the uncured composite material.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 is a cross-sectional view of a tool in accordance with an illustrative embodiment;

FIG. 3 is a cross-sectional view of a tool with a groove filler and magnetic material in accordance with an illustrative embodiment;

FIG. 4 is a cross-sectional view of an uncured composite material on a tool with a groove filler and magnetic material in accordance with an illustrative embodiment;

FIG. 5 is a cross-sectional view of an uncured composite material cut on a tool with a groove filler and magnetic material in accordance with an illustrative embodiment;

FIG. 6 is a cross-sectional view of a cut uncured composite material on a tool in accordance with an illustrative embodiment;

FIG. 7 is a cross-sectional view of a vacuum-bagged cut uncured composite material on a tool in accordance with an illustrative embodiment;

FIG. 8 is a cross-sectional view of a vacuum-bagged cut uncured composite material on a tool in accordance with an illustrative embodiment;

DETAILED DESCRIPTION

Figure 1:
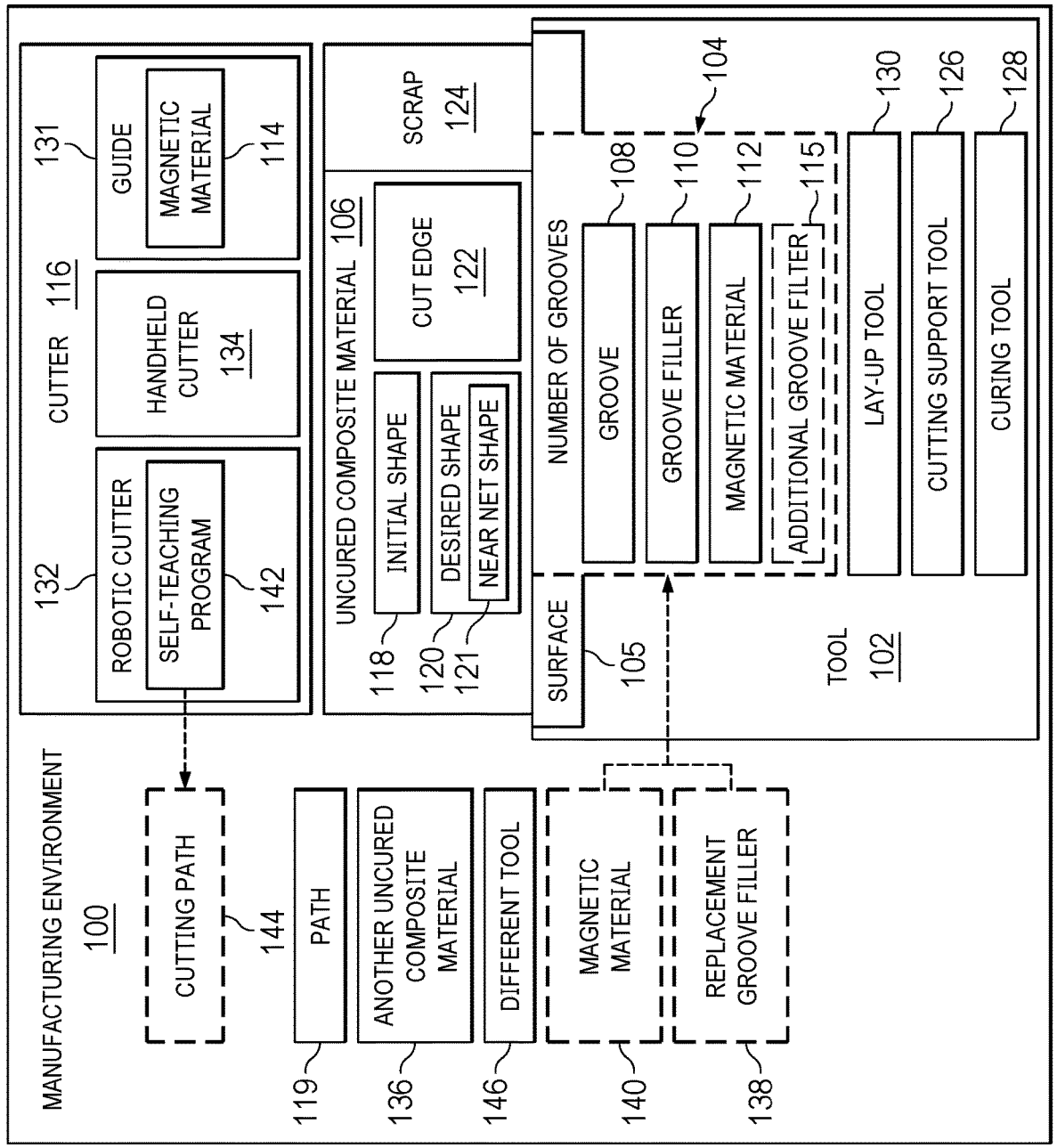
FIG. 1 is a block diagram of a manufacturing environment in which an illustrative embodiment may be implemented.

The illustrative examples recognize and take into account one or more different considerations. For example, the illustrative examples recognize and take into account that composite materials are tough, light-weight materials created by combining two or more functional components. For example, a composite material may include reinforcing fibers bound in polymer resin matrix. The illustrative examples recognize and take into account the fibers may be unidirectional or may take the form of a woven cloth or fabric.

The different layers of prepreg may be laid up in different orientations and different numbers of layers may be used depending on the thickness of the composite structure being manufactured. These layers may be laid up by hand or using automated lamination equipment such as a tape laminating machine or a fiber placement system.

After the different layers of composite material have been laid up, the layers of composite material may be consolidated and cured upon exposure to temperature and pressure, thus forming the final composite material.

In conventional composite processing, an uncured composite material is often placed in a net position by using time-consuming, large, and complicated composite placement systems. The composite material is then cured, and trimmed and drilled after curing.

The illustrative examples recognize and take into account that if an uncured composite material is cut in the uncured state, it could be laid up without the accuracy of conventional composite processing. The illustrative examples recognize and take into account that a flat composite material sheet could be positioned and trimmed in the uncured state.

The illustrative examples recognize and take into account that existing trimming processes for uncured composite material include hand and scissor cutting as well as highly complex NC (numerically controlled) programmed equipment. The illustrative examples recognize and take into account that hand cutting may not provide the accuracy that is expected for composite material. The illustrative examples recognize and take into account that for trimming by hand, the operator is blind to the backside of the trim article.

The illustrative examples recognize and take into account that NC programming involves a large capital investment, as well as time and personnel to create the NC programs. The illustrative examples recognize and take into account that the time, personnel, and capital investments of NC programming may not be desirable for scenarios in which the desired shape is not net trim.

The illustrative examples recognize and take into account that it may be desirable to utilize a low cost, accurate to an inch, trimming process on uncured (green state) composite material. The illustrative examples recognize and take into account that for aircraft and other large structures, the composite material can be too large to be performed by hand regularly. The illustrative examples recognize and take into account that near net trim materials can be obtained without the high cost or accuracy provided by NC trim equipment. The illustrative examples provide near net trim solutions at a lower cost and with no up-front engineering.

A near net material is a material with a shape and size close to the finished product. A near net material is within a desired tolerance. In some illustrative examples, the near net material is within a tolerance in the range of 0.25 inch to 1.5 inch of a final, net, shape. The tolerance for the near net material can be chosen based on the accuracy of the cutting tool, the material changes during processing of the near net material, the requirements of the intended use of the product.

The illustrative examples recognize and take into account that cutting uncured composite materials is different from cutting cured composite materials. Uncured composite material is thicker than cured composite material. The by-product of cutting uncured composite material is resin and fiber. Uncured composite materials are also sticky due to the resin. The illustrative examples recognize and take into account that due to material property differences, a different type of cutter is used to cut uncured composite material than cured composite material. The illustrative examples recognize and take into account that an ultrasonic knife is used to cut uncured material. The illustrative examples recognize and take into account that the ultrasonic knife is cleaned throughout the cutting process. The illustrative examples recognize and take into account that the ultrasonic knife is cleaned following the cutting process due to the stickiness of the uncured composite material.

With reference now to the figures, and in particular, with reference to FIG. 1, a block diagram of a manufacturing environment is depicted in which an illustrative embodiment may be implemented. A manufacturing environment 100 contains a tool 102 with a number of grooves 104 in a surface 105. Number of grooves 104 is a number of trim grooves. Prior to performing a cutting operation on an uncured composite material 106 on tool 102, sacrificial material is placed into number of grooves 104.

As used herein, "a number of" when used with reference to items means one or more items. For example, number of grooves 104 is one or more grooves.

A groove filler 110 and a magnetic material 112 is placed into number of grooves 104. Groove filler 110 is a sacrificial layer for cutting operations. During cutting operations, a cutter 116 extends into and cuts groove filler 110 while cutting an uncured composite material. Groove filler 110 can be removed and replaced after being cut by cutter 116. In some illustrative examples, an additional groove filler 115 can be placed onto top of groove filler 110 remaining after being cut.

Magnetic material 112 is configured to be detected by a guide 131 of cutter 116. Magnetic material 112 in number of grooves 104 acts to direct cutter 116 along number of grooves 104. Magnetic material 112 can take the form of a magnetic tape, a magnetic paste, a magnetic powder, or any other desirable form of magnetic material.

Groove 108 is one of number of grooves 104. Groove filler 110 and magnetic material 112 are placed into groove 108. Magnetic material 112 in groove 108 acts to direct cutter 116 along groove 108.

In some illustrative examples, groove filler 110 and magnetic material 112 are placed into a groove, such as groove 108, sequentially. In some illustrative examples, when groove filler 110 and magnetic material 112 are placed into the groove sequentially, magnetic material 112 is placed into the groove first. In some illustrative examples, groove filler 110 and magnetic material 112 are bonded to form a single insert. In some illustrative examples, when groove filler 110 and magnetic material 112 are bonded, groove filler 110 and magnetic material 112 are distinct layers. In some illustrative examples, when groove filler 110 and magnetic material 112 form a single insert, groove filler 110 and magnetic material 112 are placed into a groove, such as groove 108, together. In some illustrative examples, groove filler 110 and magnetic material 112 are mixed to form a magnetic groove filler.

Prior to being cut on tool 102, uncured composite material 106 has an initial shape 118. Uncured composite material 106 is placed on surface 105 and cutter 116 is positioned relative to uncured composite material 106. Guide 131 is configured to detect magnetic material 112. Guide 131 can take any desirable form. In some illustrative examples, guide 131 comprises a metallic material configured to detect magnetic material 112. In some illustrative examples, guide 131 comprises another magnetic material, magnetic material 114, configured to interact with and detect magnetic material 112. In some illustrative examples, guide 131 comprises a sensor configured to detect magnetic material 112. Guide 131 may be referred to as a magnetic guide. Cutter 116 is guided along groove 108 using magnetic material 112 and guide 131. Uncured composite material 106 is cut above groove 108 using cutter 116 as cutter 116 moves along a path 119 defined by groove 108, cutter 116 is guided by guide 131 detecting magnetic material 112 in groove 108. Uncured composite material 106 is cut above groove 108 using cutter 116 as magnetic material 112 guides cutter 116 along groove 108.

In some illustrative examples, cutting uncured composite material 106 above groove 108 creates a desired shape 120 for uncured composite material 106. Cutter 116 cuts uncured composite material 106 to form desired shape 120. In some illustrative examples, desired shape 120 is a near net shape 121. Cutting into uncured composite material 106 forms a cut edge 122. Cutting uncured composite material 106 separates a scrap 124 from cut edge 122 of uncured composite material 106.

Tool 102 can be referred to as a cutting support tool 126. Tool 102 supports uncured composite material 106 during cutting of uncured composite material 106 by cutter 116. In some illustrative examples, tool 102 is configured to act both as cutting support tool 126 and as a curing tool 128. When tool 102 takes the form of curing tool 128, tool 102 is formed of a material configured to withstand the temperatures and pressures of curing uncured composite material 106.

In some illustrative examples, tool 102 is configured to act as a lay-up tool 130, cutting support tool 126, and curing tool 128. In some illustrative examples, tool 102 is configured to act as lay-up tool 130 and cutting support tool 126.

Cutter 116 has a guide 131. Guide 131 is configured to detect magnetic material 112. In some illustrative examples, guide 131 comprises magnetic material 114 configured to interact with magnetic material 112. Cutter 116 with guide 131 is positioned relative to uncured composite material 106 in order to cut uncured composite material 106 above groove 108 using cutter 116 as cutter 116 moves along path 119 defined by groove 108.

In some illustrative examples, cutter 116 is a robotic cutter 132. When cutter 116 is robotic cutter 132, cutter 116 can be used to cut uncured composite material 106 without a numerically controlled program. When cutter 116 is robotic cutter 132, cutter 116 can be at least one of smaller, less complicated, or less expensive than a numerically controlled robotic cutter.

In some illustrative examples, cutter 116 is a handheld cutter 134. When cutter 116 is handheld cutter 134, cutter 116 may have higher accuracy than a handheld cutter without guide 131. When cutter 116 is robotic cutter 132, robotic security and safety measures are taken within manufacturing environment 100 to protect operators. When cutter 116 is handheld cutter 134, robotic security and safety measures are not taken for cutter 116.

In some illustrative examples, cutter 116 takes the form of an ultrasonic cutter. In some illustrative examples, during cutting operations on uncured composite material 106, cutter 116 is cleaned to remove residue from uncured composite material 106 on cutter 116. In some illustrative examples, uncured resin from uncured composite material 106 clings to cutter 116 after cutting. Cleaning cutter 116 with acetone or other solvent occurs more frequently when cutting uncured composites, including uncured composite material 106, than when cutting cured composite materials.

After performing desired processes on uncured composite material 106, uncured composite material 106 is removed from tool 102. In some illustrative examples, uncured composite material 106 is cured prior to removal from tool 102. In some illustrative examples, uncured composite material 106 is removed from tool 102 in an uncured state. After removing uncured composite material 106 from tool 102, tool 102 can be readied to support other uncured composite materials, such as another uncured composite material 136.

In some illustrative examples, groove filler 110 remaining in groove 108 after cutting uncured composite material 106 is removed from groove 108 of tool 102. In some illustrative examples, a replacement groove filler 138 is placed into groove 108 in surface 105 of tool 102 after removing the remaining portions of groove filler 110.

In some illustrative examples, magnetic material 112 is removed from groove 108 of tool 102 after cutting uncured composite material 106. In some illustrative examples, a replacement magnetic material, a magnetic material 140 is placed into groove 108 in surface 105 of tool 102 after removing magnetic material 112 from groove 108.

In some illustrative examples, another uncured composite material 136 can be cut on tool 102 using one of magnetic material 112 or magnetic material 140 as a guide for cutter 116. In some illustrative examples, another uncured composite material 136 can be cut on tool 102 using one of magnetic material 112 or magnetic material 140 as a guide for cutter other than cutter 116.

In some illustrative examples, cutter 116 is robotic cutter 132 and a self-teaching program 142 is run as cutter 116 cuts uncured composite material 106 above groove 108 to generate a cutting path 144. Cutting path 144 is generated without time and resource intensive engineer programming for a numerically controlled (NC) program. Cutting path 144 can be used to form desired shape 120 into other uncured composite materials, such as another uncured composite material 136.

In some illustrative examples, cutter 116 can use cutting path 144 to cut other uncured composite materials, such as another uncured composite material 136 on tool 102. In some illustrative examples, another uncured composite material 136 is cut on tool 102 using cutting path 144 without magnetic material 112 in groove 108. In some illustrative examples, cutter 116 can use cutting path 144 to cut other uncured composite materials, such as another uncured composite material 136, on a different tool, such as a different tool 146.

In some illustrative examples, another uncured composite material 136 is cut on tool 102 using cutting path 144 and a cutter not having a magnetic guide. In some illustrative examples, a cutter other than cutter 116 can use cutting path 144 to cut another uncured composite material 136 on a different tool, such as different tool 146.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although groove filler 110 is depicted, in some illustrative examples, groove filler 110 is not present. In some illustrative examples, magnetic material 112 and groove filler 110 are combined to form a magnetic groove filler.

As another example, manufacturing environment 100 need not be a production manufacturing environment. In some illustrative examples, manufacturing environment 100 can be a research and development environment. In some illustrative examples, manufacturing environment 100 can be a laboratory environment.

Turning to FIG. 2, a cross-sectional view of a tool is depicted in accordance with an illustrative embodiment. A tool 200 is a physical implementation of tool 102 of FIG. 1. Tool 200 has a number of grooves 202. In this illustrative example, number of grooves 202 is a groove 204. Groove 204 defines a path for cutting an uncured composite material (not depicted). The path defined by groove 204 is configured to create a desired shape in an uncured composite material when a cutter cuts the uncured composite material as it moves along the path defined by groove 204.

Turning to FIG. 3, a cross-sectional view of a tool with a groove filler and magnetic material is depicted in accordance with an illustrative embodiment. In view 300, a groove filler 302 and a magnetic material 304 have been positioned in groove 204. Groove filler 302 is a sacrificial material for cutting operations. In some illustrative examples, groove filler 302 can be referred to as a sacrificial groove filler. A guide of a cutter (not depicted) is configured to detect magnetic material 304. The position of magnetic material 304 in tool 200 directs movement of a cutter with the guide (not depicted).

In some illustrative examples, groove filler 302 and magnetic material 304 are bonded together prior to being placed in groove 204. In some illustrative examples, groove filler 302 and magnetic material 304 are bonded from a single insert and placed into groove 204 together. In some other illustrative examples, groove filler 302 and magnetic material 304 are placed into groove 204 separately.

Although magnetic material 304 is depicted as a separate layer from groove filler 302, in some non-depicted examples, magnetic material 304 is mixed into groove filler 302. In some non-depicted examples, magnetic material 304 is present throughout groove 204.

Turning to FIG. 4, a cross-sectional view of an uncured composite material on a tool with a groove filler and magnetic material is depicted in accordance with an illustrative embodiment. In view 400, an uncured composite material 402 is on a surface 404 of tool 200. In some illustrative examples, uncured composite material 402 can be placed onto surface 404 in a lay-up procedure. When uncured composite material 402 is placed onto surface 404 in a lay-up procedure, uncured composite material 402 is built in layers in a series of steps.

In other illustrative examples, uncured composite material 402 is placed onto surface 404 in a pick and place operation. When uncured composite material 402 is placed onto surface 404 in a pick and place operation, uncured composite material 402 is laid up on a separate tool and moved to tool 200.

Uncured composite material 402 has an initial shape 406. Initial shape 406 is not a net or near-net shape. In some illustrative examples, initial shape 406 is the shape formed during a lay-up process on tool 200. In some illustrative examples, initial shape 406 is the shape of uncured composite material 402 after being laid up on another tool and then placed onto tool 200.

Turning to FIG. 5, a cross-sectional view of an uncured composite material cut on a tool with a groove filler and magnetic material is depicted in accordance with an illustrative embodiment. In view 500, a cutting operation has been performed using a cutter, such as cutter 116 of FIG. 1, with a guide that interacts with magnetic material 304 in groove 204.

In view 500, uncured composite material 402 has a desired shape 502. A scrap 504 is separated from a cut edge 506 of uncured composite material 402. Scrap 504 is excess composite material trimmed from uncured composite material 402 during the cutting operation.

In some illustrative examples, the cutter extends into and cuts groove filler 302 while cutting uncured composite material 402, leaving a remaining groove filler 508 within groove 204. In view 500, the cutting operation has cut into groove filler 302. Portions of groove filler 302 have been removed, leaving remaining groove filler 508.

In this illustrative example, the cutter guided by magnetic material 304 cuts above groove 204. In some other non-depicted examples, magnetic material 304 is in a groove separate from groove filler 302. In some of these non-depicted examples, magnetic material 304 guides the cutter to cut offset from magnetic material 304.

In some illustrative examples, uncured composite material 402 can be removed from tool 200 and placed onto a separate curing tool. In these illustrative examples, tool 200 is used as at least one of a layup tool and a cutting support tool.

After any desired processing of uncured composite material 402, tool 200 can be used to support additional uncured composite materials for cutting. In some illustrative examples, after removing uncured composite material 402 from tool 200 and prior to performing cutting operations on additional uncured composite materials on tool 200, remaining groove filler 508 is removed from groove 204 of tool 200. Additional groove filler is placed into groove 204 after removal of remaining groove filler 508. In some illustrative examples, this additional groove filler may be referred to as a second groove filler or a replacement groove filler. In some illustrative examples, after removing uncured composite material 402 from tool 200 and prior to performing cutting operations on additional uncured composite materials on tool 200, an additional groove filler is placed on top of remaining groove filler 508 to refill groove 204 of tool 200.

Turning to FIG. 6, a cross-sectional view of a cut uncured composite material on a tool is depicted in accordance with an illustrative embodiment. In view 600, scrap 504 of FIG. 5 has been removed. In view 600, a bagging material 602 is positioned on surface 404 of tool 200. Bagging material 602 can be used to seal a vacuum bag to surface 404 of tool 200.

Turning to FIG. 7, a cross-sectional view of a vacuum-bagged cut uncured composite material on a tool is depicted in accordance with an illustrative embodiment. In view 700, a vacuum bag 702 has been positioned for processing of uncured composite material 402. Vacuum bag 702 is sealed to bagging material 602. A bagging material 704 has been applied to surface 404 of tool 200. Vacuum bag 702 is sealed to bagging material 704.

Turning to FIG. 8, a cross-sectional view of a vacuum-bagged cut uncured composite material on a tool is depicted in accordance with an illustrative embodiment. In view 800, scrap 504 of FIG. 5 has been removed. In view 800, bagging material 602 is positioned on surface 404 of tool 200. A vacuum bag 802 is sealed to surface 404 of tool 200 by bagging material 602.

A bagging material 804 is also positioned on surface 404 of tool 200. Vacuum bag 802 is sealed to surface 404 of tool 200 by bagging material 804.

Vacuum bag 802 includes a magnetic material 806. Magnetic material 806 is attracted to magnetic material 304. Magnetic material 806 and magnetic material 304 can be used to align vacuum bag 802. In some non-depicted illustrative examples, another channel and magnetic material 304 can be present between bagging material 804 and uncured composite material 402. In these non-depicted illustrative examples, additional magnetic material is present in vacuum bag 802 to interface with the additional magnetic material in the additional channel. In these non-depicted illustrative examples, magnetic material 806 can be used to align vacuum bag 802 around the whole of desired shape 502.

Figure 9:
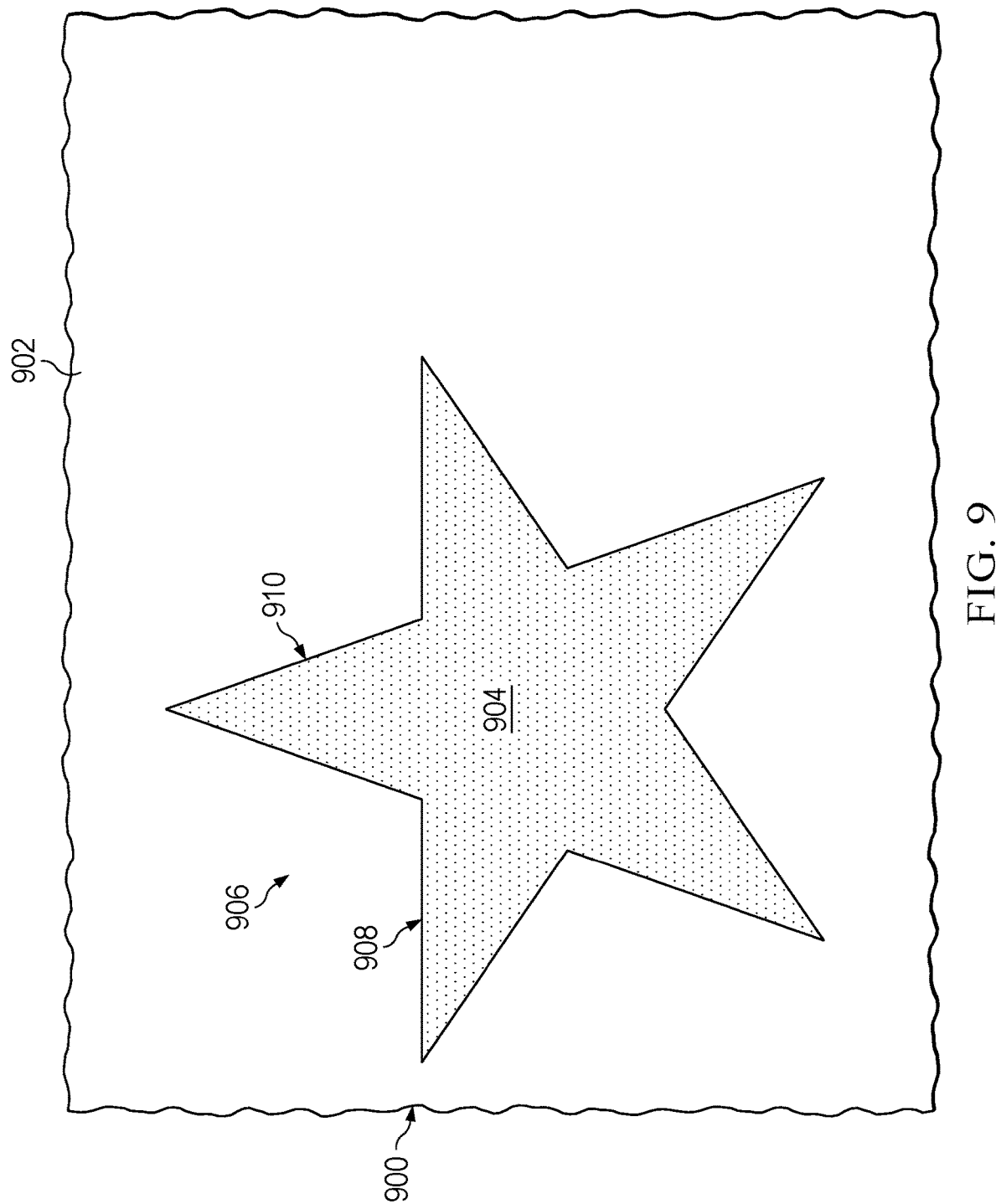
FIG. 9 is a top view of a cut uncured composite material on a tool in accordance with an illustrative embodiment.

Turning to FIG. 9, a top view of a cut uncured composite material on a tool is depicted in accordance with an illustrative embodiment. Tool 900 is a physical implementation of tool 102 of FIG. 1. In some illustrative examples, a tool 900 is the same as tool 200 of FIGS. 2-8.

Tool 900 has a surface 902. An uncured composite material 904 having a desired shape 906 is positioned on surface 902 of tool 900. In this illustrative example, desired shape 906 is a star. As depicted, scrap has been removed following a cutting operation on uncured composite material 904. A number of grooves 908 is visible around desired shape 906 of uncured composite material 904. Number of grooves 908 define a path 910 for cutting desired shape 906 into uncured composite material 904.

Figure 10A:
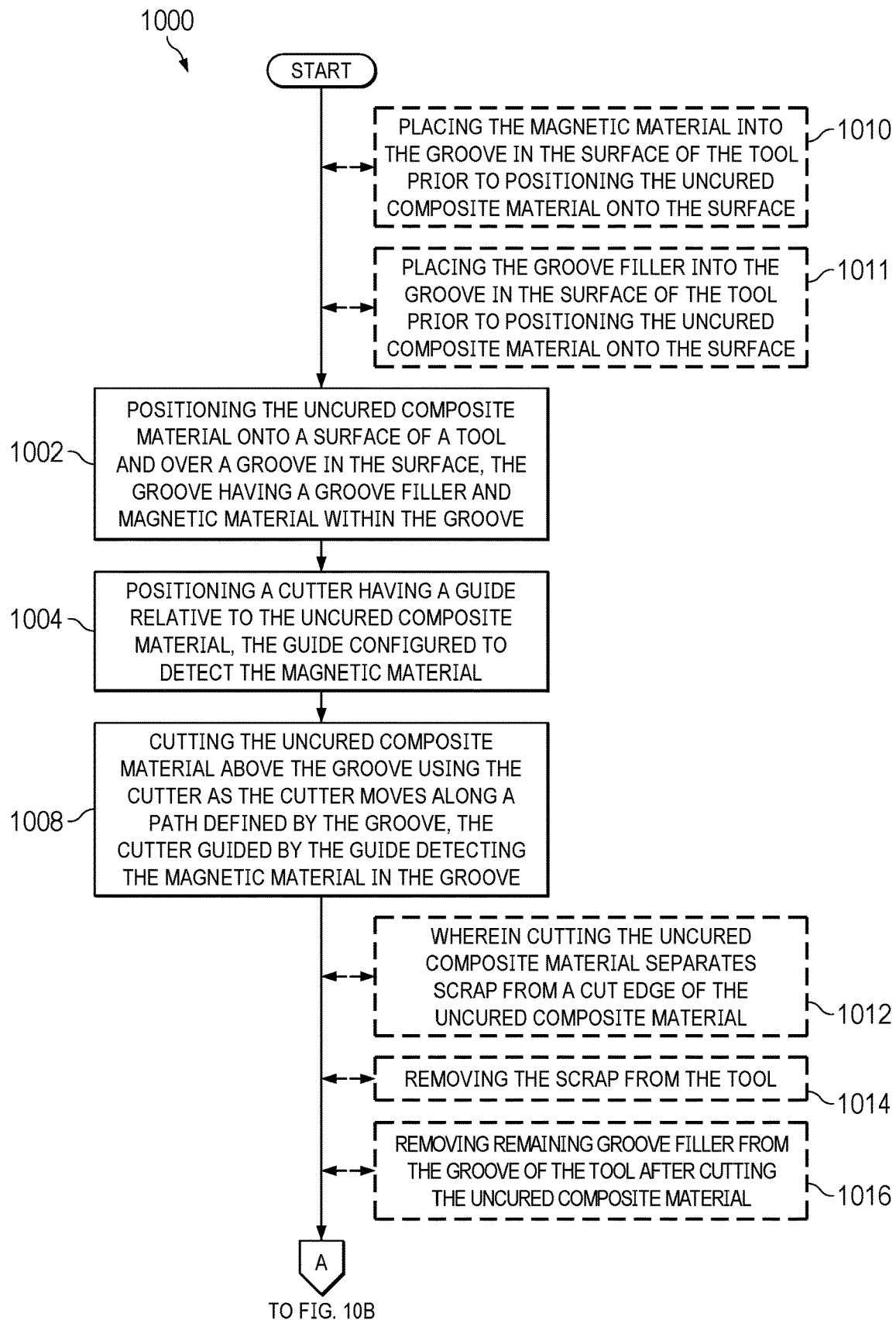
FIGS. 10A and 10B is a flowchart of a method of cutting an uncured composite material in accordance with an illustrative embodiment.
Figure 10B:
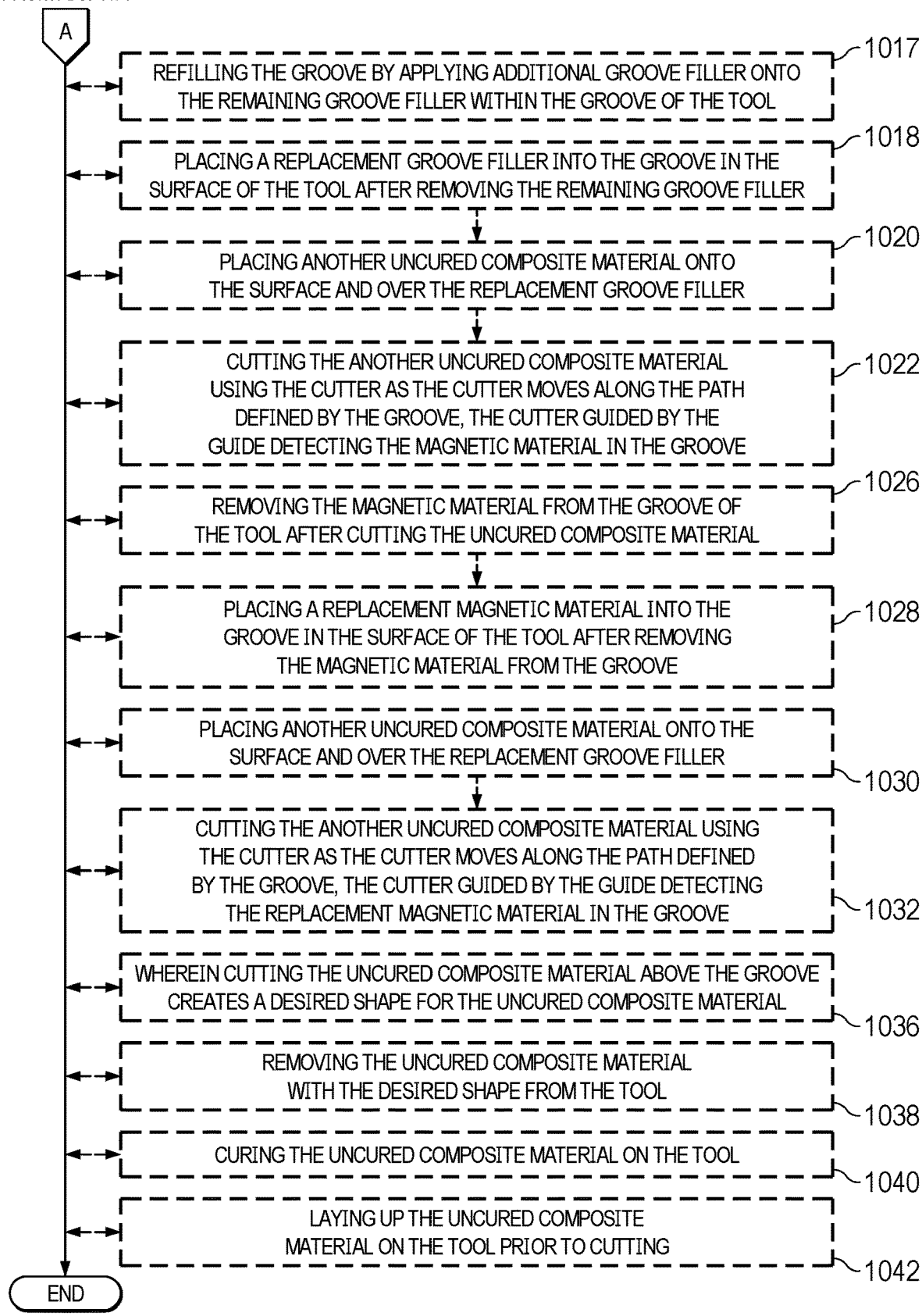

Turning to FIGS. 10A and 10B, a flowchart of a method of cutting an uncured composite material is depicted in accordance with an illustrative embodiment. A method 1000 can be performed using tool 102 and cutter 116 of FIG. 1. Method 1000 can be performed using tool 200 of FIGS. 2-8. Method 1000 can be performed using tool 900 of FIG. 9.

Method 1000 positions the uncured composite material onto a surface of a tool and over a groove in the surface, the groove having a groove filler and magnetic material within the groove (operation 1002). Method 1000 positions a cutter having a guide relative to the uncured composite material, the guide configured to detect the magnetic material (operation 1004). In some illustrative examples, the cutter is a handheld cutter. In some illustrative examples, the cutter is a robotic cutter.

Method 1000 cuts the uncured composite material above the groove using the cutter as the cutter moves along a path defined by the groove, the cutter guided by the guide detecting the magnetic material in the groove (operation 1008). Afterwards, the method terminates.

In some illustrative examples, method 1000 places the magnetic material into the groove in the surface of the tool prior to positioning the uncured composite material onto the surface (operation 1010). In some illustrative examples, the magnetic material is reusable. In some illustrative examples, the magnetic material can be used to guide the cutter during multiple cutting actions. In some illustrative examples, method 1000 places the groove filler into the groove in the surface of the tool prior to positioning the uncured composite material onto the surface (operation 1011). In some illustrative examples, the groove filler is placed into the groove as the magnetic material is placed into the groove. In some illustrative examples, the groove filler is placed into the groove after the magnetic material is placed into the groove.

In some illustrative examples, cutting the uncured composite material separates scrap from a cut edge of the uncured composite material (operation 1012), and method 1000 further comprises removing the scrap from the tool (operation 1014). In some illustrative examples, removing the scrap from the tool leaves the uncured composite material with a desired shape. In some illustrative examples, the desired shape is a near net shape.

In some illustrative examples, the cutter extends into and cuts the groove filler while cutting the uncured composite material, leaving remaining groove filler within the groove. In some illustrative examples, method 1000 removes remaining groove filler from the groove of the tool after cutting the uncured composite material (operation 1016). In some illustrative examples, method 1000 refills the groove by applying additional groove filler onto the remaining groove filler within the groove of the tool (operation 1017). In some illustrative examples, method 1000 removes both the groove filler and the magnetic material from the groove after cutting the uncured composite material. In some illustrative examples, method 1000 places a replacement groove filler into the groove in the surface of the tool after removing the remaining groove filler (operation 1018). In some illustrative examples, method 1000 places a replacement groove filler and a replacement magnetic material into the groove at the same time.

In some illustrative examples, method 1000 places another uncured composite material onto the surface and over the replacement groove filler (operation 1020). In some illustrative examples, method 1000 cuts the another uncured composite material using the cutter as the cutter moves along the path defined by the groove, the cutter guided by the guide detecting the magnetic material in the groove (operation 1022).

In some illustrative examples, method 1000 removes the magnetic material from the groove of the tool after cutting the uncured composite material (operation 1026). In some illustrative examples, method 1000 places a replacement magnetic material into the groove in the surface of the tool after removing the magnetic material from the groove (operation 1028).

In some illustrative examples, method 1000 places another uncured composite material onto the surface and over the replacement groove filler (operation 1030). In some illustrative examples, method 1000 cuts the another uncured composite material using the cutter as the cutter moves along the path defined by the groove, the cutter guided by the guide detecting the replacement magnetic material in the groove (operation 1032).

In some illustrative examples, cutting the uncured composite material above the groove creates a desired shape for the uncured composite material (operation 1036). In some illustrative examples, method 1000 removes the uncured composite material with the desired shape from the tool (operation 1038).

In some illustrative examples, method 1000 cures the uncured composite material on the tool (operation 1040). When the uncured composite material is cured on the tool, the tool is configured to withstand the temperature and pressure of the curing. In some illustrative examples, method 1000 lays up the uncured composite material on the tool prior to cutting (operation 1042).

Figure 11:
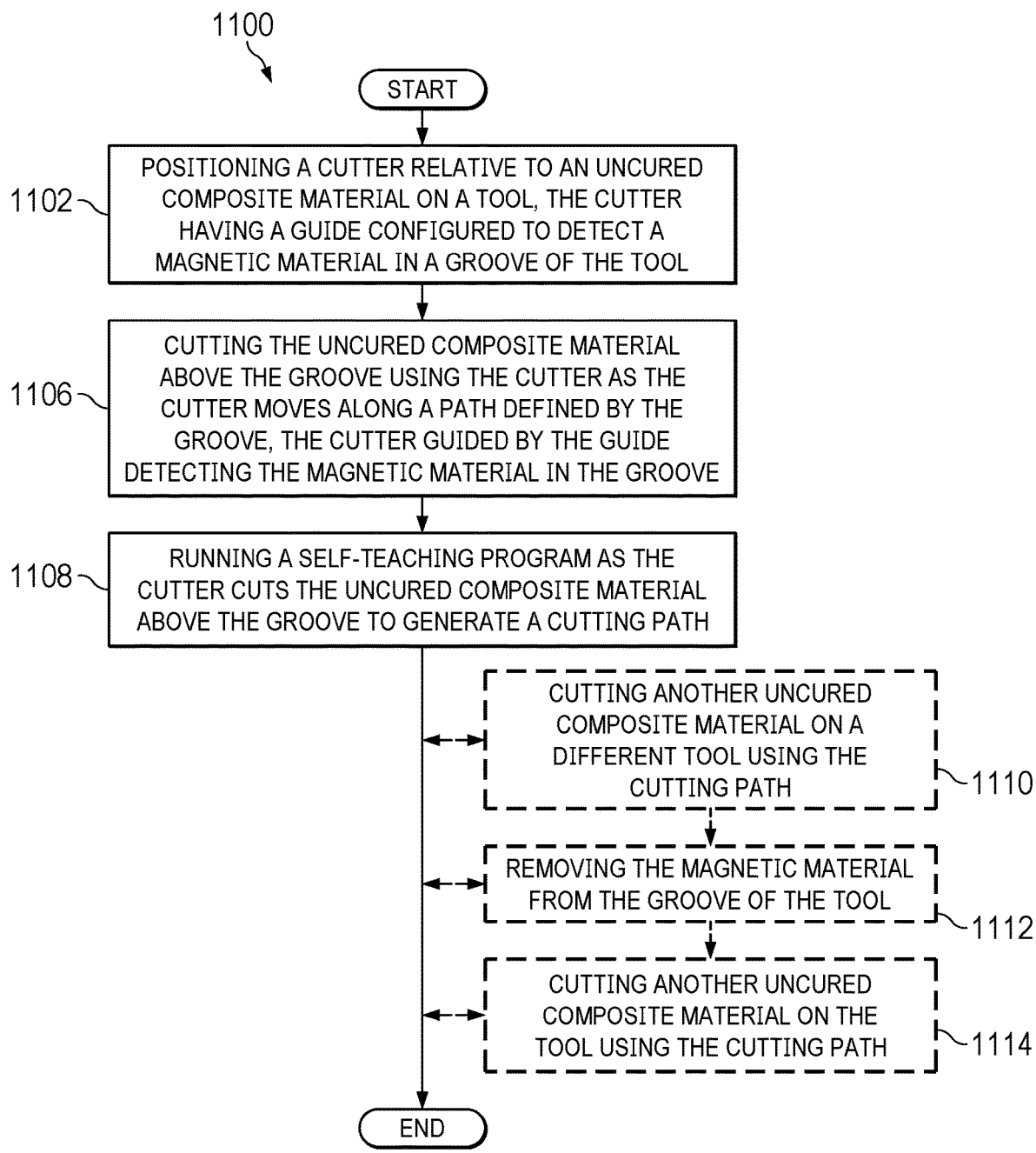
FIG. 11 is a flowchart of a method of generating a numerical control cutting program in accordance with an illustrative embodiment.

Turning to FIG. 11, a flowchart of a method of generating a numerical control cutting program is depicted in accordance with an illustrative embodiment. A method 1100 can be performed using tool 102 and cutter 116 of FIG. 1. Method 1100 can be performed using tool 200 of FIGS. 2-8. Method 1100 can be performed using tool 900 of FIG. 9.

Method 1100 positions a cutter relative to an uncured composite material on a tool, the cutter having a guide configured to detect a magnetic material in a groove of the tool (operation 1102). Method 1100 cuts the uncured composite material above the groove using the cutter as the cutter moves along a path defined by the groove, the cutter guided by the guide detecting the magnetic material in the groove (operation 1106). Method 1100 runs a self-teaching program as the cutter cuts the uncured composite material above the groove to generate a cutting path (operation 1108). Afterwards, the method terminates.

In some illustrative examples, method 1100 cuts another uncured composite material on a different tool using the cutting path (operation 1110). In some of these illustrative examples, the magnetic material is used to generate a cutting path to be used by other cutters and other tools. In some of these illustrative examples, cutting of the uncured composite material is used to form a cutting path for cutting other composite materials on other tools.

In some illustrative examples, method 1100 removes the magnetic material from the groove of the tool (operation 1112). In some illustrative examples, method 1100 cuts another uncured composite material on the tool using the cutting path (operation 1114) after removing the magnetic material from the groove of the tool in operation 1112. In some illustrative examples, method 1100 cuts another uncured composite material on the tool using the cutting path (operation 1114) while the magnetic material is still within the groove of the tool. The another uncured composite material on the tool is cut using the cutting path independent of a guide of the cutter. In some illustrative examples, the another uncured composite material on the tool is cut using the cutting path and a cutter not having a magnetic guide. In some illustrative examples, the another uncured composite material on the tool is cut using a cutter having a magnetic guide, but the cutter is guided using the cutting path and not the guide.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1010 through operation 1042 may be optional. As another example, operation 1110 through operation 1116 may be optional.

Figure 12:
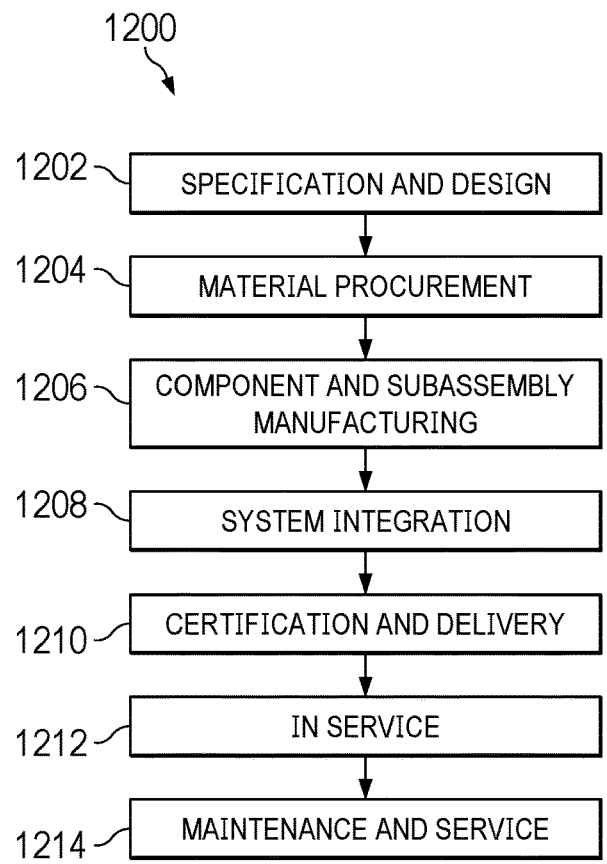
FIG. 12 is an illustration of an aircraft manufacturing and service method in a form of a block diagram in accordance with an illustrative embodiment.
Figure 13:
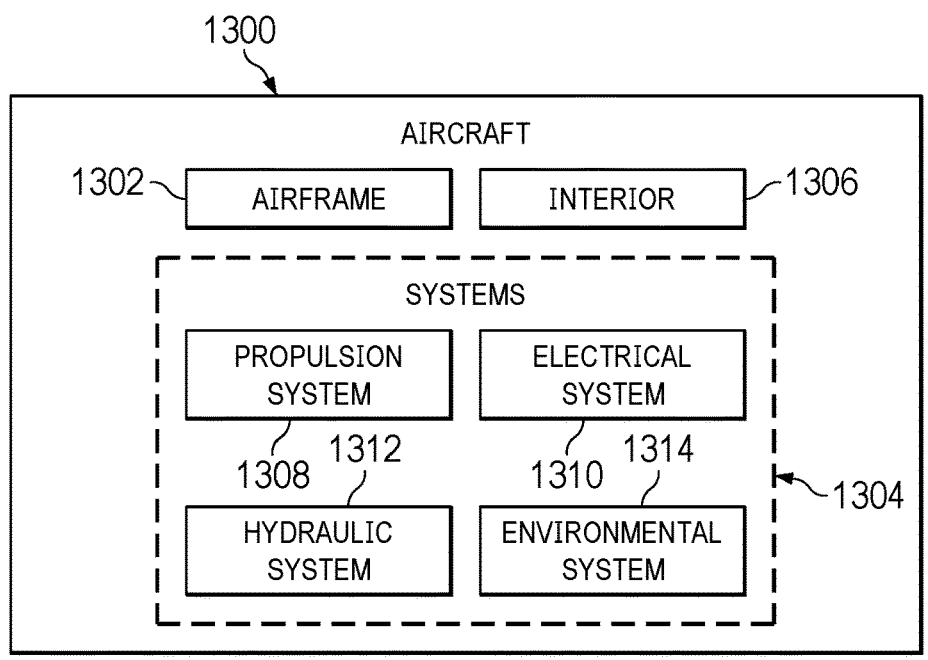
FIG. 13 is an illustration of an aircraft in a form of a block diagram in which an illustrative embodiment may be implemented.

Illustrative embodiments of the present disclosure may be described in the context of aircraft manufacturing and service method 1200 as shown in FIG. 12 and aircraft 1300 as shown in FIG. 13. Turning first to FIG. 12, an illustration of an aircraft manufacturing and service method in a form of a block diagram is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 takes place. Thereafter, aircraft 1300 may go through certification and delivery 1210 in order to be placed in service 1212. While in service 1212 by a customer, aircraft 1300 is scheduled for routine maintenance and service 1214, which may include modification, reconfiguration, refurbishment, or other maintenance and service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft in the form of a block diagram is depicted in which an illustrative embodiment may be implemented. In this example, aircraft 1300 is produced by aircraft manufacturing and service method 1200 of FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included.

Apparatuses and methods embodied herein may be employed during at least one of the stages of aircraft manufacturing and service method 1200. One or more illustrative embodiments may be used during component and subassembly manufacturing 1206, system integration 1208, in service 1212, or maintenance and service 1214 of FIG. 12. For example, tool 102 can be used to guide cutter 116 to form a portion of aircraft 1300 during component and subassembly manufacturing 1206. In some illustrative examples, tool 102 can be used to guide cutter 116 of FIG. 1 during maintenance and service 1214 to form a rework or a replacement component. As another example, method 1000 can be used to form a portion of aircraft 1300. Method 1000 of FIG. 10 can be used during at least one of component and subassembly manufacturing 1206 or maintenance and service 1214. Method 1100 of FIG. 11 can be used to form a cutting path for use in at least one of component and subassembly manufacturing 1206 or maintenance and service 1214.

The illustrative examples provide a novel approach to cutting uncured composite materials. The illustrative examples utilize magnets to guide a cutter. The illustrative examples reduce the time and resources to provide a trim line that meets desired tolerances. The illustrative examples provide a trim line within desired tolerances without sacrificing additional time and budget for NC programming by an operator. The illustrative examples can be utilized in production. The illustrative examples can be utilized in small batch or research and development applications. The illustrative examples can provide flexibility for research and development applications.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of cutting an uncured composite material, the method comprising:
   positioning the uncured composite material onto a surface of a tool and over a groove in the surface, the groove having a groove filler and magnetic material within the groove;
   positioning a cutter having a guide relative to the uncured composite material, the guide configured to detect the magnetic material; and
   cutting the uncured composite material above the groove using the cutter as the cutter moves along a path defined by the groove, the cutter guided by the guide detecting the magnetic material in the groove.

2. The method of claim 1 further comprising:
   placing the magnetic material into the groove in the surface of the tool prior to positioning the uncured composite material onto the surface.

3. The method of claim 1 further comprising:
   placing the groove filler into the groove in the surface of the tool prior to positioning the uncured composite material onto the surface.

4. The method of claim 1, wherein cutting the uncured composite material separates scrap from a cut edge of the uncured composite material.

5. The method of claim 4 further comprising:
   removing the scrap from the tool.

6. The method of claim 1, wherein the cutter extends into and cuts the groove filler while cutting the uncured composite material, leaving remaining groove filler within the groove.

7. The method of claim 6 further comprising:
   removing the remaining groove filler from the groove of the tool after cutting the uncured composite material; and
   placing a replacement groove filler into the groove in the surface of the tool after removing the remaining groove filler.

8. The method of claim 6, further comprising:
   refilling the groove by applying additional groove filler onto the remaining groove filler within the groove of the tool.

9. The method of claim 7 further comprising:
   placing another uncured composite material onto the surface and over the replacement groove filler; and
   cutting the another uncured composite material using the cutter as the cutter moves along the path defined by the groove, the cutter guided by the guide detecting the magnetic material in the groove.

10. The method of claim 1, wherein cutting the uncured composite material above the groove creates a desired shape for the uncured composite material, and further comprising:
    removing the uncured composite material with the desired shape from the tool.

11. The method of claim 1, wherein the cutter is a handheld cutter.

12. The method of claim 1, wherein the cutter is a robotic cutter.

13. The method of claim 1 further comprising:
    curing the uncured composite material on the tool.

14. The method of claim 1 further comprising:
    laying up the uncured composite material on the tool prior to cutting.

15. A method of generating a numerical control cutting program, the method comprising:
    positioning a cutter relative to an uncured composite material on a tool, the cutter having a guide configured to detect a magnetic material in a groove of the tool;
    cutting the uncured composite material above the groove using the cutter as the cutter moves along a path defined by the groove, the cutter guided by the guide detecting the magnetic material in the groove; and
    running a self-teaching program as the cutter cuts the uncured composite material above the groove to generate a cutting path.

16. The method of claim 15 further comprising:
    cutting another uncured composite material on a different tool using the cutting path.

17. The method of claim 15 further comprising:
    removing the magnetic material from the groove of the tool; and
    cutting another uncured composite material on the tool using the cutting path.

18. The method of claim 15 further comprising:
    cutting another uncured composite material on the tool using the cutting path.

19. A tool comprising:
    a surface configured to support uncured composite material during cutting of the uncured composite material;
    a number of grooves in the surface;
    a groove filler within the number of grooves; and
    magnetic material within the number of grooves.

20. The tool of claim 19, wherein the groove filler and the magnetic material are bonded to form a single insert.

21. The tool of claim 19, wherein the tool is configured to act as a cutting support tool and a curing tool.

22. The tool of claim 19, wherein the tool is configured to act as a lay-up tool, cutting support tool, and curing tool.

* * * * *